United States Patent
Kim et al.

(10) Patent No.: US 7,863,510 B2
(45) Date of Patent: Jan. 4, 2011

(54) METHOD, MEDIUM, AND SYSTEM CLASSIFYING MUSIC THEMES USING MUSIC TITLES

(75) Inventors: Jung Eun Kim, Suwon-si (KR); Hyoung Gook Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 981 days.

(21) Appl. No.: 11/650,446

(22) Filed: Jan. 8, 2007

(65) Prior Publication Data

US 2007/0208990 A1 Sep. 6, 2007

(30) Foreign Application Priority Data

Feb. 23, 2006 (KR) .................. 10-2006-0017768

(51) Int. Cl.
*G10H 7/00* (2006.01)
*G06F 17/30* (2006.01)

(52) U.S. Cl. ................. 84/609; 84/601; 707/758; 707/688

(58) Field of Classification Search .......... 84/609
See application file for complete search history.

(56) References Cited

U.S. PATENT DOCUMENTS

| | | | |
|---|---|---|---|
| 6,199,034 B1 * | 3/2001 | Wical | 704/9 |
| 6,351,494 B1 * | 2/2002 | Kondo et al. | 375/240.27 |
| 6,826,724 B1 | 11/2004 | Shimada et al. | |
| 6,842,876 B2 | 1/2005 | Schilit et al. | |
| 7,194,471 B1 * | 3/2007 | Nagatsuka et al. | 707/100 |
| 2002/0181711 A1 * | 12/2002 | Logan et al. | 381/1 |
| 2003/0015084 A1 * | 1/2003 | Bengtson | 84/622 |
| 2005/0109194 A1 * | 5/2005 | Gayama | 84/613 |
| 2005/0120868 A1 * | 6/2005 | Hinman et al. | 84/615 |
| 2005/0211071 A1 * | 9/2005 | Lu et al. | 84/611 |
| 2009/0031882 A1 * | 2/2009 | Kemp et al. | 84/609 |

FOREIGN PATENT DOCUMENTS

| | | |
|---|---|---|
| KR | 2003-0084590 | 11/2003 |
| KR | 10-2004-0054772 | 6/2004 |
| KR | 10-2004-0078896 | 9/2004 |
| KR | 10-2005-0076764 | 7/2005 |

OTHER PUBLICATIONS

Kai Chen et al. 'Music Genres Classification Using Text Categorization Method' 2006, Institute for Infocomm Research, pp. 221-224.*

(Continued)

*Primary Examiner*—Elvin G Enad
*Assistant Examiner*—Christopher Uhlir
(74) *Attorney, Agent, or Firm*—Staas & Halsey LLP (57) ABSTRACT

A method, medium, and system classifying a music theme for music by using a corresponding music title, by generating a theme class vector in association with the music theme, generating a music title class vector in association with the music title, calculating similarity between the theme class vector and the music title class vector, and assigning a theme of the music title based on the similarity.

27 Claims, 8 Drawing Sheets

OTHER PUBLICATIONS

Stefan Brecheisen et al. 'MUSCLE: Music Classigication Engine with User Feedback' 2006, Institute for Informatics, University of Munich, pp. 1164-1167.*

Ido Dagan et al. 'Similarity-Based Estimation of Word Cooccurrence', AT&T Bell Laboratories, Divison of Applied Sciences Harvard University, pp. 272-278.*

Tony Mullen et al. 'Sentiment Analysis Using Support Vector Machines with Diverse Information Sources', National Institute of Informatics, pp. 1-7.*

Kai Chen et al. 'Music Genres Classification Using Text Categorization Method' 2006, Institute for Infocomm Research, pp. 221-224.*

Stefan Brecheisen et al. 'Muscle: Music Classigication Engine with User Feedback' 2006, Institute for Informatics, University of Munich, pp. 1164-1167.*

Ido Dagan et al. 'Similarity-Based Estimation of Word Cooccurrence', 1994, AT&T Bell Laboratories, Divison of Applied Sciences Harvard University, pp. 272-278.*

Tony Mullen et al. 'Sentiment Analysis Using Support Vector Machines with Diverse Information Sources', 2004, National Institute of Informatics, pp. 1-7.*

Song, D., et al. (2003) Classifying Document Titles Based on Information Inference. In N. Zhong et al. (Eds.): ISMIS 2003, LNAI 2871, p. 297-306, 2003.

* cited by examiner

METHOD, MEDIUM, AND SYSTEM CLASSIFYING MUSIC THEMES USING MUSIC TITLES

CROSS-REFERENCE TO RELATED APPLICATIONS

This application claims priority from Korean Patent Application No. 10-2006-0017768, filed on Feb. 23, 2006, in the Korean Intellectual Property Office, the disclosure of which is incorporated herein by reference.

BACKGROUND OF THE INVENTION

1. Field of the Invention

Embodiments of the present invention relate to a method, medium, and system which expresses music titles and themes as class vectors and assigns a theme to each music title based on similarity, thereby classifying music by theme.

2. Description of the Related Art

Currently, as new music is being added every day, users are increasingly enjoying their music anytime and anywhere with media devices or online music providers. However, with such increase in music, there is a need for an easy way to retrieve one's desired music by classifying and managing the available music according to a certain criterion, such as through themes, e.g., rock, classical, jazz.

Conventionally, music is stored and managed based on each singer and genre such that users may retrieve their desired music by searching using the particular singer or particular music genre. However, to classify music by other classification, in addition to the singer and the genre, an administrator of the music provider has to physically individually review music, one by one, to classify each in to genres.

However, in such a conventional technique, much time is required in searching the differing music and an administrator has to manually classify each. Further, as the number of classification categories are limited, various types of music cannot be classified for each genre.

Accordingly, the inventors of the present application have found that there is a need for automatically classifying, storing, and managing a large amount of music, e.g., a large number of music files, for each theme, to satisfy desires of users and efficiently manage the available music.

SUMMARY OF THE INVENTION

An aspect of an embodiment of the present invention provides a method, medium, and system in which a theme class vector is generated in association with a music theme, a music title class vector is generated in association with a music title, similarity between the theme class vector and the music title class vector is calculated, a theme of the music title is assigned based on the similarity, and a music file is classified and stored for each theme, thereby satisfying a desire of users and efficiently managing a large number of music files.

An aspect of an embodiment of the present invention further provides a method, medium, and system determining such a similarity by calculating an inner product of a theme class vector and a music title class vector, and assigning a theme having a maximum similarity value as the theme of a music title, thereby automatically classifying a theme of a music file by using a music title instead of manually classifying the theme of the music file one by one by a system administrator as conventionally required.

An aspect of an embodiment of the present invention further provides a method, medium, and system in which feature candidates may be extracted from a music title stored in a music title database, a feature candidate whose chi square statistics is greater than an average value of the chi square statistics of the feature candidates may be selected as a feature, and a theme class vector may be generated by assigning a feature value of the feature.

Additional aspects and/or advantages of the invention will be set forth in part in the description which follows and, in part, will be apparent from the description, or may be learned by practice of the invention.

To achieve the above and/or other aspects and advantages, embodiments of the present invention include a method of classifying music, including generating a theme class vector corresponding to at least one music theme, generating a music title class vector corresponding to a music title for the music, calculating a similarity between the theme class vector and the music title class vector, and assigning a theme of the music title, to classify the music according to theme, based on the similarity.

The generating of the theme class vector may include extracting feature candidates from the music title, selecting a feature from the extracted feature candidates, and generating the theme class vector by assigning a feature value of the selected feature.

In addition, the extracting of the feature candidates from the music title may include analyzing a morpheme of the music title, and extracting a class unigram and class co-occurrence of the music title.

Here, the extracting of the class unigram and class co-occurrence may include extracting a content word and an end of a word from the music title, and assigning a class to the respective content word and the end of the word via an ontology search.

The extracting of the class unigram and class co-occurrence may still further include expressing the music title in a row of a class, and extracting two certain classes as the feature candidates when the two certain classes are detected in one music title.

The extracting of the two certain classes as the feature candidates may include extracting class co-occurrences $C_i*C_j$ as the feature candidates when classes $C_i$ and $C_j$ satisfy a following condition:

$$c_i \subset m_k \text{ and } c_j \subset m_k \text{ and } |L(c_i)-L(c_j)| \leq \alpha$$

Here, $m_k$ is the music title expressed in the row and $L(x)$ is an index of x in the $m_k$.

In addition, the selecting of the feature from the extracted feature candidates may include selecting the feature from the extracted feature candidates based on predetermined chi square statistics.

Further, the selecting of the feature from the extracted feature candidates based on predetermined chi square statistics may include calculating chi square statistics as associated with each feature candidate, calculating an average of the calculated chi square statistics, and selecting class having a chi square statistic greater than the average of the chi square statistics as the feature.

The generating of the theme class vector by assigning the feature value of the selected feature may further include assigning the feature value of the feature by using binary numbers.

Here, the assigning of the feature value of the feature by using binary numbers may include establishing a binary 1 as the feature value when the respective feature corresponds to a relevant theme, establishing a binary 0 as the feature value when the respective feature does not correspond to the relevant theme, and generating the theme class vector based on the established feature value.

The method may still further include maintaining the music title in a music title database.

In addition, the calculating of the similarity between the theme class vector and the music title class vector may include calculating an inner product of the theme class vector and the music title class vector, and determining the calculated inner product to be the similarity.

The assigning of the theme of the music title based on the similarity may further include assigning the theme having a maximum similarity value as the theme of the music title.

To achieve the above and/or other aspects and advantages, embodiments of the present invention include at least one medium including computer readable code to implement a method of classifying music, the method may include generating a theme class vector corresponding to at least one music theme, generating a music title class vector corresponding to a music title for the music, calculating a similarity between the theme class vector and the music title class vector, and assigning a theme of the music title, to classify the music according to theme, based on the similarity.

To achieve the above and/or other aspects and advantages, embodiments of the present invention include a system classifying music, including a theme class vector generation unit to generate a theme class vector corresponding to at least one music theme, a music title class vector generation unit to generate a music title class vector corresponding to a music title for the music, a similarity calculation unit to calculate a similarity between the theme class vector and the music title class vector, and a music title theme assignment unit to assign a theme of the music title, to classify the music according to theme, based on the similarity.

The system may further include a feature candidate extraction unit to extract feature candidates from the music title, and a feature selection unit to select a feature from the extracted feature candidates, wherein the theme class vector generation unit generates the theme class vector by assigning a feature value of the selected feature.

Here, the feature candidate extraction unit may analyze a morpheme of the music title and extract a class unigram and class co-occurrence of the music title.

Further, the feature candidate extraction unit may extract a content word and an end of a word from the music title and assign a class to the respective content word and the end of the word via an ontology search.

The feature candidate extraction unit may express the music title in a row of a class and extract two certain classes as the feature candidates when the two certain classes are detected in one music title.

In addition, the feature selection unit may select the feature from the extracted feature candidates based on predetermined chi square statistics.

Further, the feature selection unit may calculate chi square statistics as associated with each feature candidate, calculate an average of the calculated chi square statistics, and select a class having a chi square statistic greater than the average of the chi square statistics as the feature.

In addition, the theme class vector generation unit may establish a binary 1 as the feature value when the respective feature corresponds to a relevant theme, establish a binary 0 as the feature value when the respective feature does not correspond to the relevant theme, and generate the theme class vector based on the established feature value.

The system may further include a music title database for maintaining at least a plurality of music titles, including the music title.

Still further, the he music title class vector generation unit may extract a feature by analyzing a morpheme of the music title, and by extract a class unigram and class co-occurrence of the music title, and generate the music title class vector by assigning a feature value to the extracted feature.

The similarity calculation unit may calculate an inner product of the theme class vector and the music title class vector and determine the calculated inner product to be the similarity.

The music title theme assignment unit may assign the theme having a maximum similarity value as the theme of the music title.

To achieve the above and/or other aspects and advantages, embodiments of the present invention include a method of classifying music, including generating a music title class vector corresponding to a music title for music, calculating a similarity between a theme class vector and the music title class vector, wherein the theme class vector corresponds to at least one music theme, and assigning a theme of the music title, to classify the music according to theme, based on the similarity.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. Embodiments are described below to explain the present invention by referring to the figures.

Figure 1:
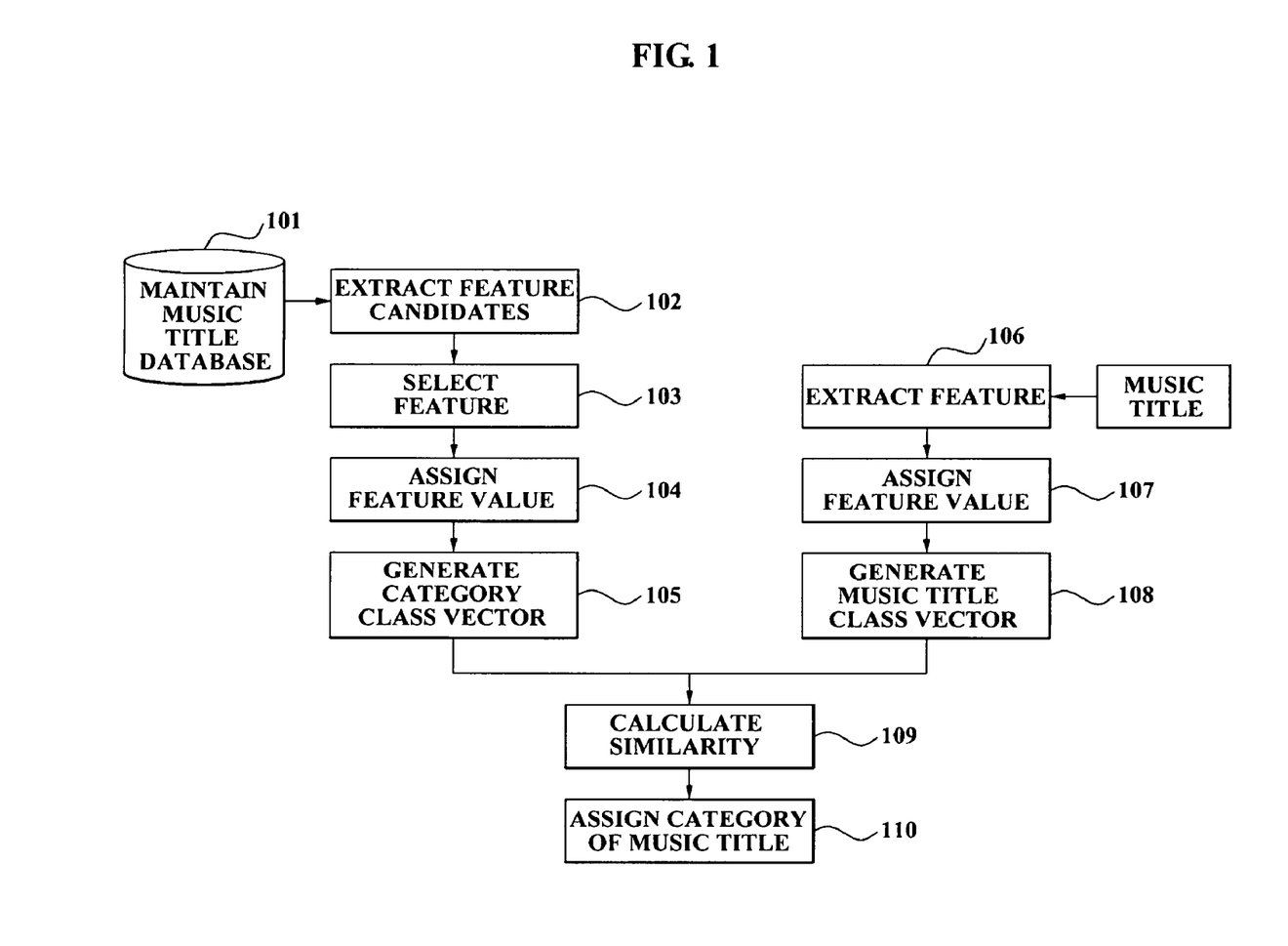
FIG. 1 illustrates a method of classifying a music theme by using a music title, according to an embodiment of the present invention.

FIG. 1 illustrates a method of classifying a music theme by using a music title, according to an embodiment of the present invention.

In operation 101, music titles may be maintained in a music title database, for example. Such a music title database may store only the music title, or may store the corresponding music file and music information associated with the music title in addition to the music title. Further, the music title database may store the music title classified for each theme. Alternatives are equally available.

In operation 102, feature candidates may be extracted from a music title stored in such a music title database, for example. Here, a morpheme of the music title may be analyzed to extract the feature candidates, a class unigram may be extracted, and a class co-occurrence may be established as the feature candidates.

A content word and an end of a word may be extracted from the music title and the class unigram may be extracted by assigning a class to the extracted content word and the end of the word. According to an embodiment of the present invention, the class may be used instead of the word since data for the title may be sparse due to the potential short lengths of music titles. In addition, since the end of the word affects a meaning in the music title, the end of the word may be extracted to be assigned with the class. The content word may be created by dividing the music title into meaningful morphemes.

The music title may be expressed in a row of the class and the class co-occurrence may be extracted when two certain classes are shown in one music title. The class co-occurrence may be extracted by considering a relationship between the class unigrams. Namely, the class co-occurrence may be extracted by considering a relationship between the extracted word, the content word, and the end of the word.

Figure 2:
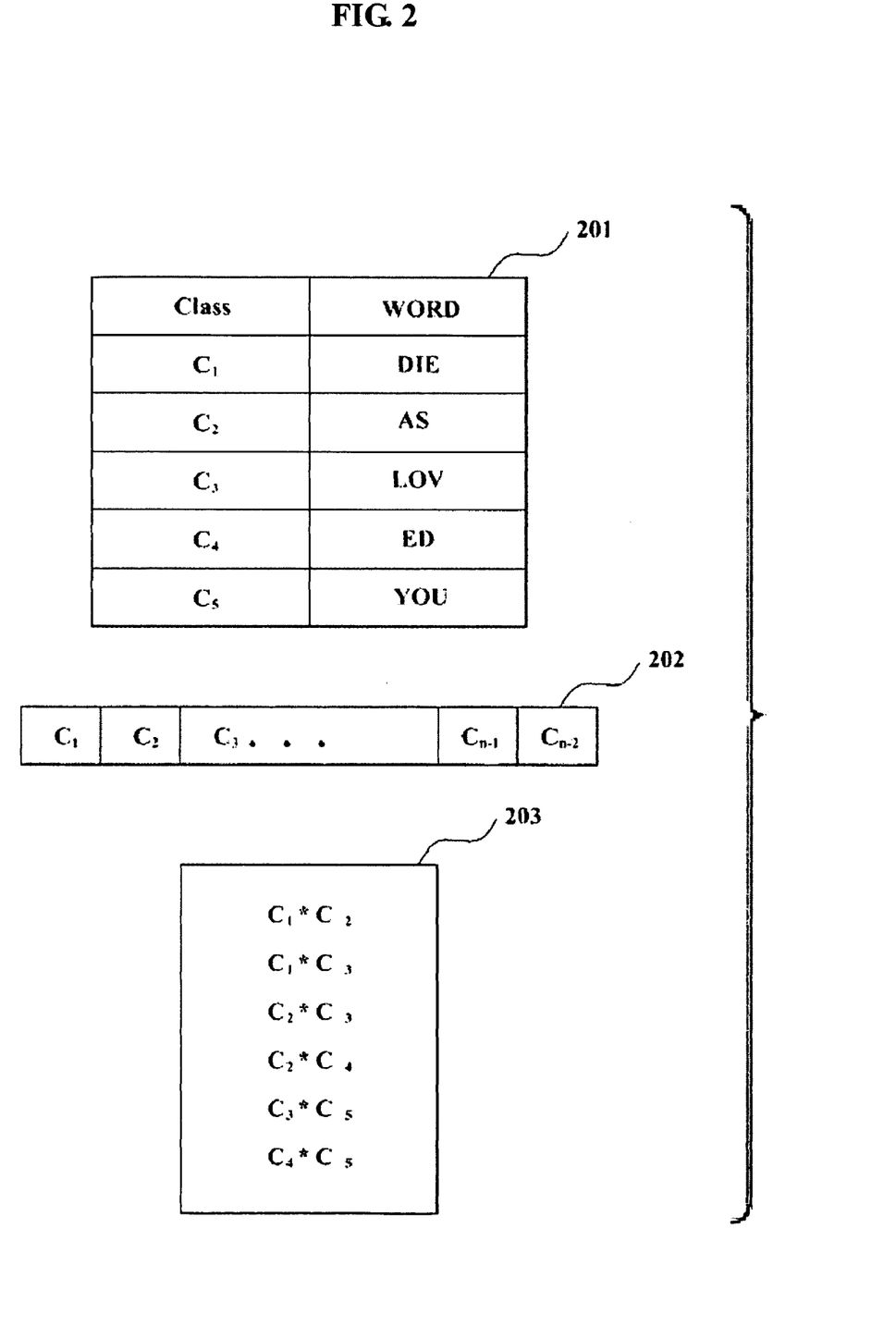
FIG. 2 illustrates extracted feature candidates, according to an embodiment of the present invention.

As only an example, FIG. 2 illustrates extracted feature candidates, according to an embodiment of the present invention.

The terms "die", "as", "lov", "ed", and "you" may be extracted from a music title of "loved you as die" as content words and an end of word. Here, a class may be assigned to the extracted content word and the end of the word.

As shown in a top table 201 in FIG. 2, the music theme classification system may assign the class designator $C_1$ to "die", $C_2$ to "as", $C_3$ to "lov", $C_4$ to "ed", and $C_5$ to "you", for example.

As shown in a center table 202 in FIG. 2, the music theme classification system may express a music title $m_k$ in an array for class. The music theme classification system may express a plurality of music titles stored in the music title database in such an array of the class.

The music theme classification system may extract a class co-occurrence $C_i * C_j$ as a feature candidate when the class $C_i$ and $C_j$ satisfies a condition of the following Equation 1.

$$c_i \subset m_k \text{ and } c_j \subset m_k \text{ and } |L(c_i) - L(c_j)| \leq \alpha \qquad \text{Equation 1:}$$

Here, L(x): x indicates an index of $m_k$.

As shown in table 203 in FIG. 2, the music theme classification system may extract the co-occurrence when α is established to be 2. The co-occurrence between the content word and the end of the word, as well as the content word and the end of the word extracted as class unigrams. The class co-occurrence may be established by an administrator of the music theme classification system, and relationships between adjacent content words or relationships between the content word and the end of the word may be extracted.

For example, when "did we really love each other?" may be compared with "love you more than anyone" in class co-occurrence, content words "love" and "did" of "did we really love each other?" may be determined to be included in a theme indicating "parting" more than "love". Content words "love" and "anyone" of "love you more than anyone" may be determined to be included in a theme indicating "love".

Accordingly, according to an embodiment, the music theme classification system may accurately assign the theme of the music title by extracting the feature candidates by using the class unigram and the class co-occurrence.

Referring again to FIG. 1, in operation 103, the music theme classification system may select a feature from the feature candidates. According to an embodiment of the present invention, the music theme classification system may select the feature from the feature candidates by using a predetermined chi square statistics.

For example, the music theme classification system may measure dependence of the class and the theme by using chi square statistics of Equation 2.

Equation 2:

$$\chi^2(c, t) = \frac{N(AD - CB)^2}{(A+C)(B+D)(A+B)(C+D)}$$

Here, c corresponds to class, t corresponds to theme, A corresponds to a number of files which are included in t and include c, B corresponds to a number of files which are included in themes excluding t and including c, C correspond to a number of files which are included in t and do not include c, d correspond to a number of files which are included in the themes excluding t and c, and N correspond to a total number of learning files.

Thus, the chi square statistics may be calculated in association with each of the feature candidates and may calculate an average value of the calculated chi square statistics. Classes, whose frequency is less than a certain value, may be excluded from selection of the feature because the chi square statistics of low-frequency words may not be reliable. Accordingly, classes whose chi square statistics is greater than the average value of the calculated chi square statistics may be selected as the feature.

In operation 104, a feature value of such a feature may be assigned by using binary numbers. For example, the feature value may be established to be a binary 1 when the feature corresponds to a relevant theme, and the feature value may be established to be a binary 0 when the feature does not correspond to the relevant theme. Thus, according to an embodiment of the present invention, the feature value may be established as the binary 1 when the chi square statistics is greater than the average value of the calculated chi square statistics.

In operation 105, the theme (category) class vector may be generated by establishing the feature value of a respective feature. The theme class vector may, thus, be generated by establishing the feature value of the feature as the binary 0 or 1.

Figure 3:
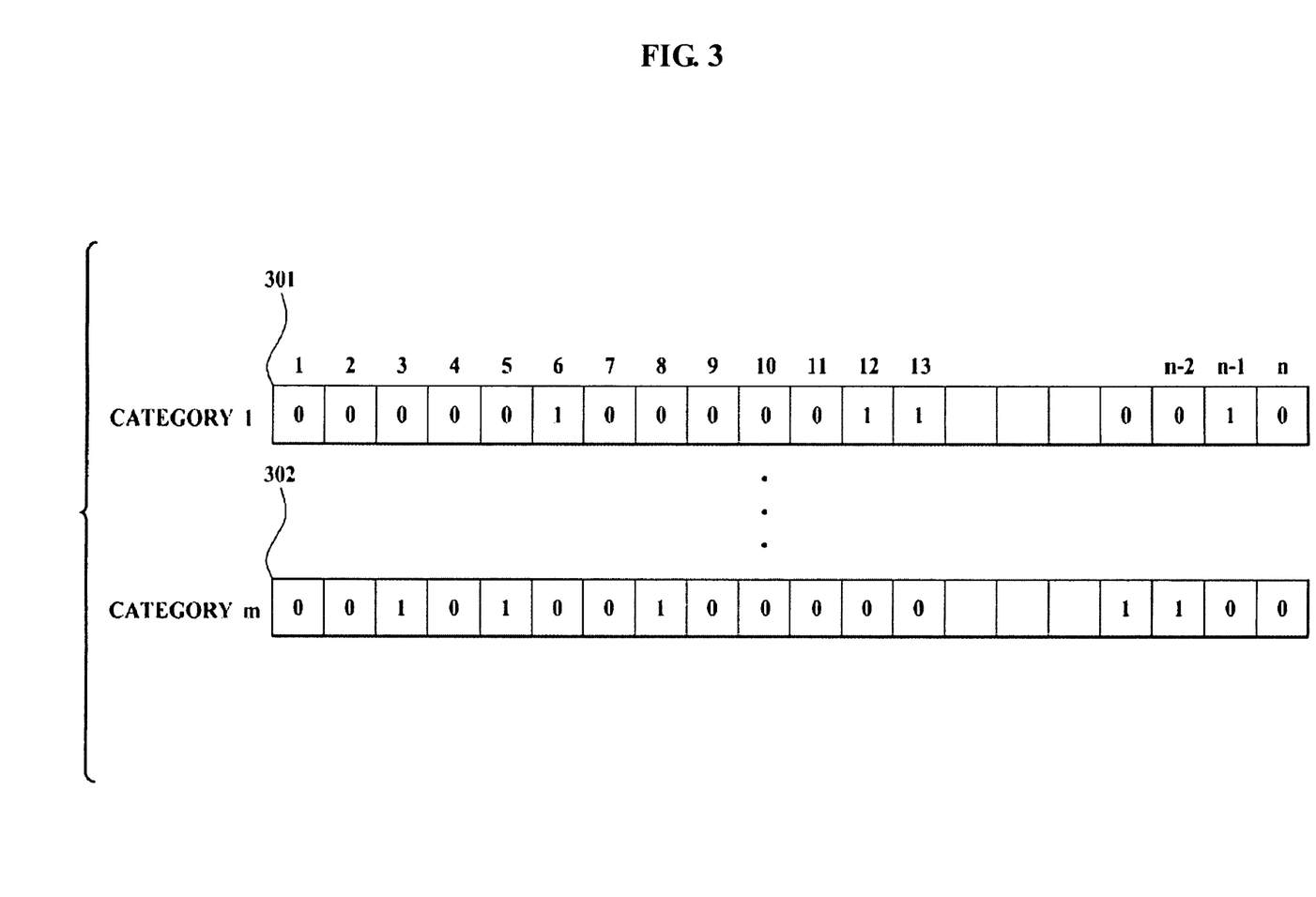
FIG. 3 illustrates theme class vectors, according to an embodiment of the present invention.

FIG. 3 illustrates theme class vectors, according to an embodiment of the present invention. As shown in FIG. 3, theme class vectors 301 and 302 may be expressed as vectors of the features and may be generated by establishing the feature value of the respective feature as the binary 0 or 1.

Referring to FIG. 1 again, in operation 106, the feature may be extracted from a music title to which a theme will be assigned. The feature may be extracted by collecting the class unigram and the class co-occurrence from the music title, as performed in operation 102.

In operation 107, the feature value of the respective feature may, thus, be assigned. The music title may be expressed as the vector of the features, and the feature value may be assigned to be the binary 1 when a relevant feature is shown in the music title or may be assigned to be the binary 0 when the relevant feature is not shown in the music title.

In operation 108, a music title class vector including the feature value may, thus, be generated.

Figure 4:
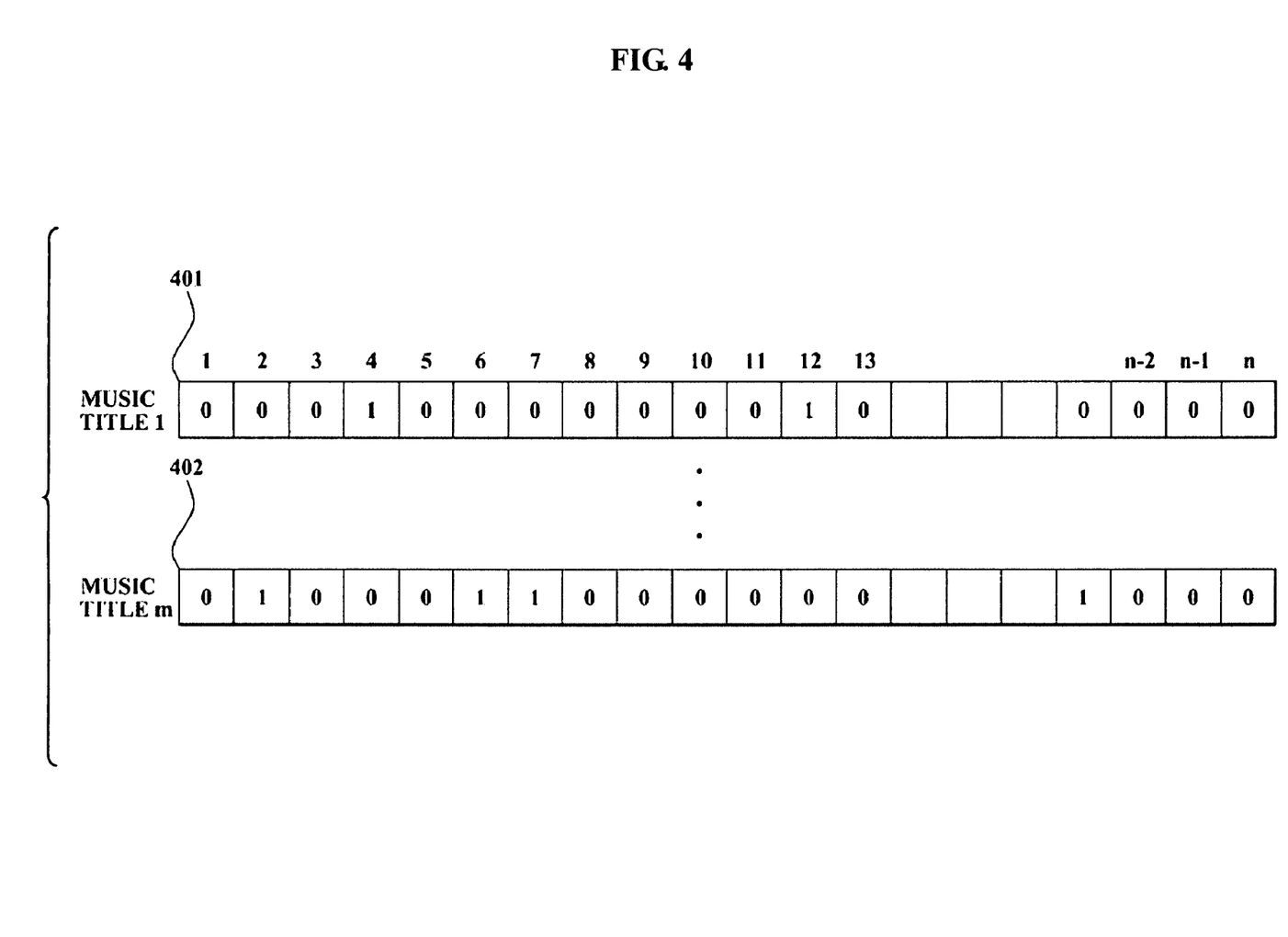
FIG. 4 illustrates music title class vectors, according to an embodiment of the present invention.

FIG. 4 illustrates music title class vectors, according to an embodiment of the present invention. As shown in FIG. 4, music title class vectors 401 and 402 may be expressed as the vector of the features and may be generated by establishing the feature value of the respective feature to be the binary 0 or 1.

Referring to FIG. 1, in operation 109, a similarity between the theme class vector and the music title class vector may be calculated. In particular, an inner product of the theme class vector and the music title class vector may be calculated and the inner product may be established as this similarity.

In operation 110, a theme of the music title may be assigned based on the similarity.

Figure 5:
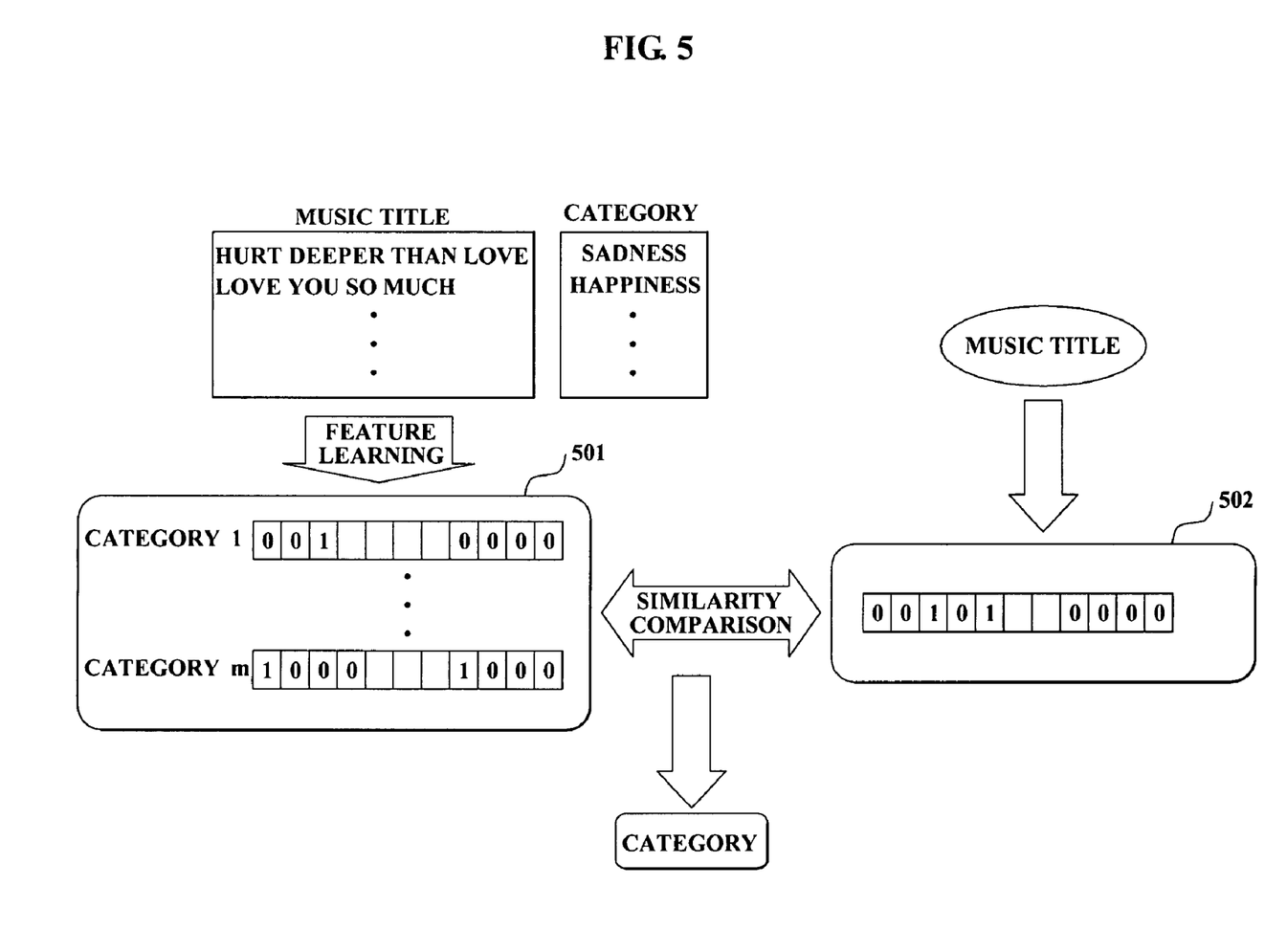
FIG. 5 illustrates themes assigned to music titles, according to an embodiment of the present invention.

For example, the music theme classification system may assign a theme having a maximum similarity value to be the theme of the music title by using the below Equation 3.

$$sim_{max}(m) = \max_{i=1}^{n}\{c_i \cdot m\}$$ Equation 3:

FIG. 5 illustrates themes assigned to music titles, according to an embodiment of the present invention. Referring to FIG. 5, a theme class vector associated with a theme of "sadness" may be generated via a theme class vector generation process, and a music title class vector 502 associated with a music title of "hurt deeper than love" may be generated via a music title class vector generation process.

To assign the theme of the music title of "hurt deeper than love", a similarity may be generated by calculating an inner product of the theme class vector 501 and the music title class vector 502. The similarity may be calculated by an inner product of a theme class vector associated with other themes such as "love" and "parting", in addition to "sadness", and the music title class vector 502 and may assign the theme associated with the theme class vector with a maximum inner product from the theme class vectors to be the theme of the music title of "hurt deeper than love".

As described above, according to an embodiment of the present invention, similarity may be calculated by using a theme class vector generated in association with a music theme and a music title class vector generated in association with a music title, a theme of the music title may be assigned based on the similarity, and a music file may be classified and stored for each theme, thereby permitting the classification of a large number of music files for each theme by using the music title, which may easily be extracted from the music file.

Figure 6:
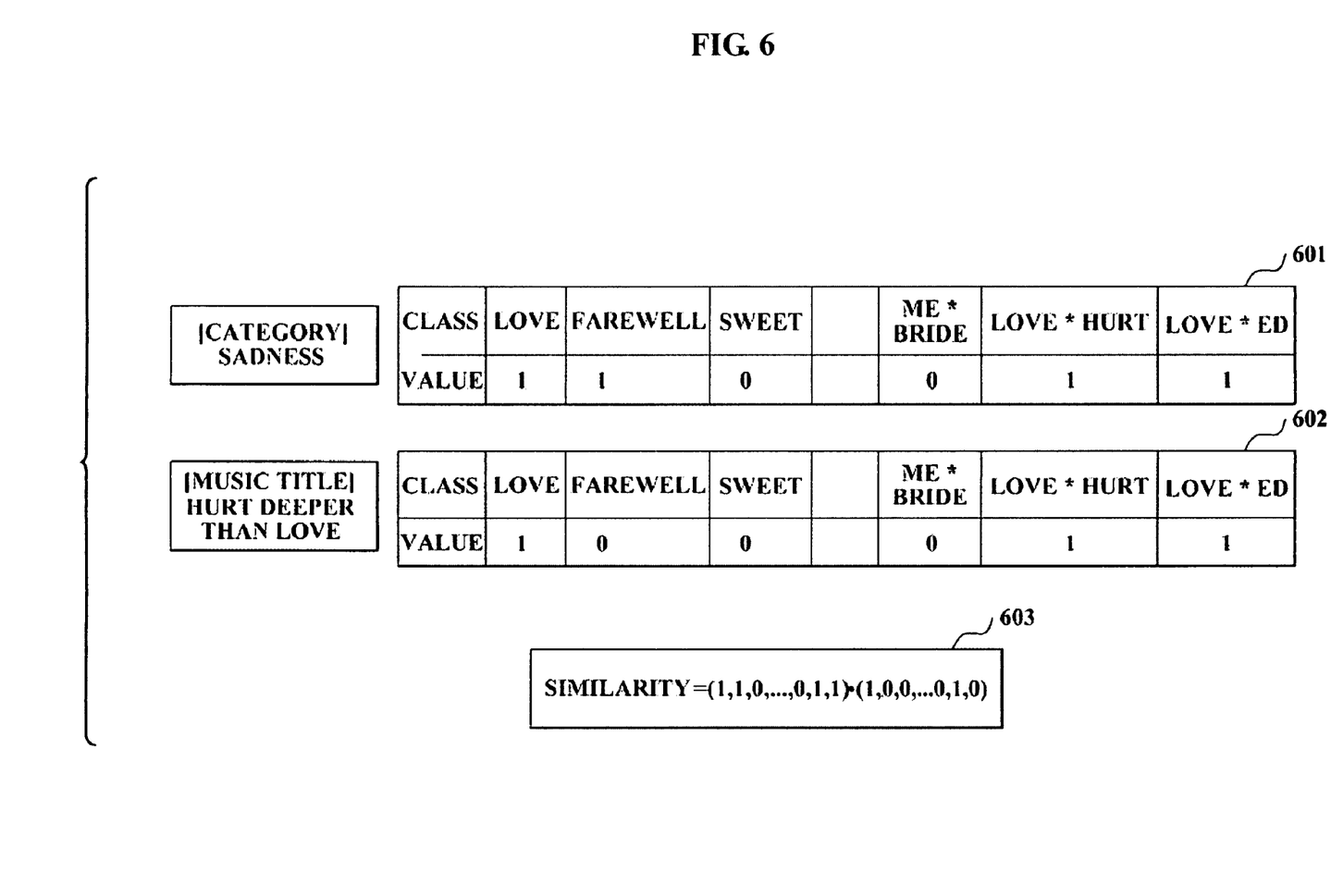
FIG. 6 illustrates a classifying of music titles, according to an embodiment of the present invention.

FIG. 6 illustrates a process of classifying music titles, according to an embodiment of the present invention.

Themes may have previously been classified, e.g., by a music theme classification system of the present invention, into "sadness", "happiness", and "love" by using the music title stored in the music title database and each theme class vector 601 associated with the classified theme may be generated. A music title class vector 602 associated with a music title to which a theme will be assigned may be generated, e.g., from the music titles stored in the music title database. A theme associated with a theme class vector having a maximum value obtained by calculating an inner product of the respective theme class vector 601 and the music title class vector 602 may further be assigned. Similarity 603 may thus be generated.

Figure 7:
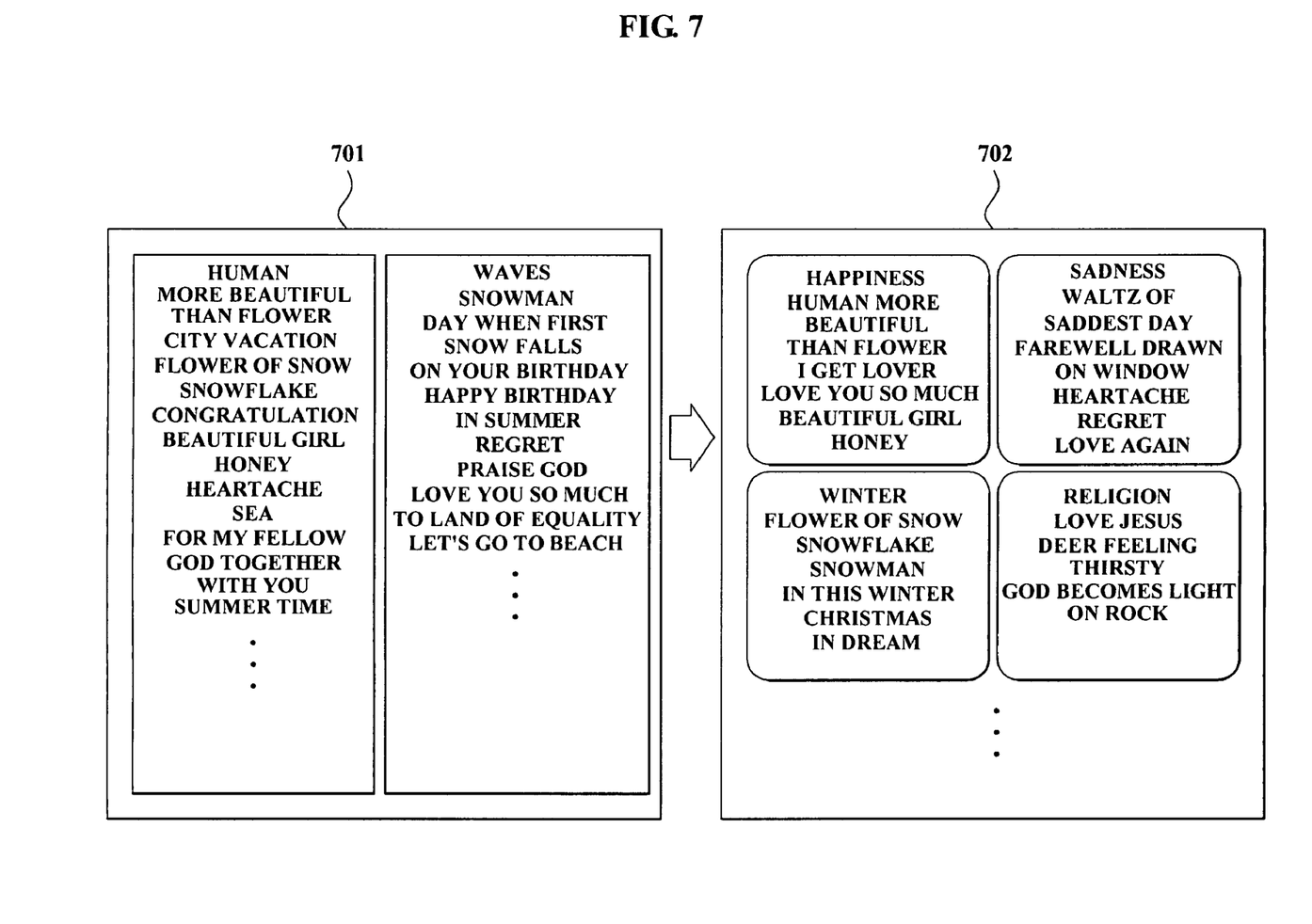
FIG. 7 illustrates a result of a classifying of music themes by music titles, according to an embodiment of the present invention.

FIG. 7 illustrates a result of a classifying of music themes by music titles, according to an embodiment of the present invention.

As shown in table 701, conventionally, music files are stored and managed without any standards.

Conversely, as shown in table 702, according to an embodiment of the present invention, themes may be classified as "happiness", "sadness", "winter", and "religion" by performing the aforementioned operations 101 through 110 of FIG. 1, for example, and music titles may be stored and managed by classifying the music titles according to the themes. Unlike the conventional techniques, where an administrator must manually classifies a theme of a music file, one by one, a music theme classification system of the present invention may automatically, for example, classify the music files for each theme.

Figure 8:
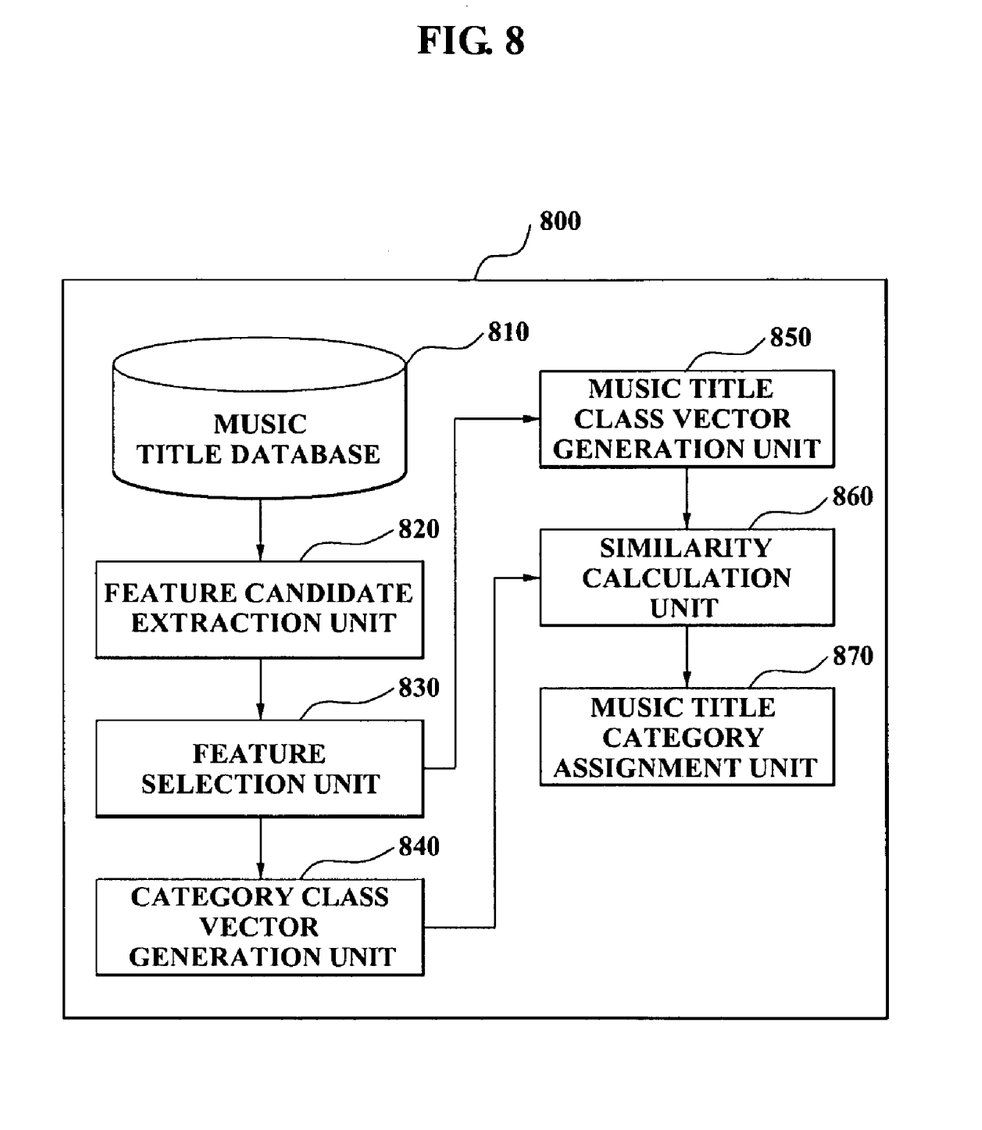
FIG. 8 illustrates a system classifying a music theme, according to an embodiment of the present invention.

FIG. 8 illustrates such a system to classify music themes, according to an embodiment of the present invention.

The system classifying a music theme (hereinafter, referred to as a music theme classification system 800) may include a music title database 810, a feature candidate extraction unit 820, a feature selection unit 830, a theme (category) class vector generation unit 840, a music title class vector generation unit 850, a similarity calculation unit 860, and a music title theme (category) assignment unit 870, for example.

The music title database 810 may store music files classified for each theme. According to an embodiment of the present invention, the music title database 810 may further store music files and music information associated with the music files together with the music titles. The music information may also include singer information, album information, and music file size information, noting that alternative embodiments are equally available.

The feature candidate extraction unit 820 may extract feature candidates from a music title stored in the music title database 810, for example. The feature candidate extraction unit 820 may further analyze a morpheme of a music title, and may extract a class unigram and class co-occurrence of the music title. The feature candidate extraction unit 820 may still further extract a content word and an end of a word from the music title, and may extract the class unigram by assigning a class to the extracted content word and an end of the word via an ontology search, for example. In addition, according to an embodiment of the present invention, the feature candidate extraction unit 820 may express the music title in an array (or row) of class and may extract the class co-occurrence when two certain classes are shown in one music title, e.g., such as discussed above regarding Equation 1.

The feature selection unit 830 may select a feature from the extracted feature candidates, and may further select the feature from the extracted feature candidates by using predetermined chi square statistics, e.g., such as that discussed above regarding Equation 2. The feature selection unit 830, thus, may further calculate the chi square statistics associated with a respective feature candidate, calculate an average value of the extracted chi square statistics, and select a class or class co-occurrence whose chi square statistics is greater than the average value, as the feature, for example.

The theme class vector generation unit 840 may generate the theme class vector by assigning a feature value of the selected feature. In one embodiment, the theme class vector generation unit 840 may establish the feature value to be a binary 1 when the respective feature corresponds to a relevant theme, may establish the feature value to be a binary 0 when the respective feature does not correspond to the relevant theme, and may generate the theme class vector by using the established feature value, for example.

The music title class vector generation unit 850 may generate a music title class vector in association with the music title. According to an embodiment, the music title vector generation unit 850 may analyze a morpheme of the music title, extract a feature by extracting a class unigram and class co-occurrence of the music title, and generate the music title class vector by assigning a feature value of the extracted feature, for example.

The similarity calculation unit 860 may further compute a similarity between the theme class vector and the music title class vector. According to one embodiment, the similarity calculation unit 860 may calculate an inner product of the theme class vector and the music title class vector, and may further establish the calculated inner product as the similarity, for example.

The music title theme assignment unit 870 may assign a theme of the music title based on the similarity. For example, the music title theme assignment unit 870 may assign any of a plurality of themes having maximum similarity values as the theme of the music title, e.g., such as that shown in Equation 3.

In addition to the above described embodiments, embodiments of the present invention can also be implemented through computer readable code/instructions in/on a medium, e.g., a computer readable medium. The medium can correspond to any medium/media permitting the storing and/or transmission of the computer readable code.

The computer readable code can be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to embodiments of the present invention. The media may also be a distributed network, so that the computer readable code is stored/transferred and executed in a distributed fashion.

According to an embodiment of the present invention, a theme class vector may be generated in association with a music theme, a music title class vector may be generated in association with a music title, and a similarity between the theme class vector and the music title class vector may be calculated. At least one theme for the music title may be assigned based on the calculated similarity, and the corresponding music file may be classified and stored according to each theme, thereby satisfying a desire of users and efficiently managing a large number of music files.

In addition, according to an embodiment of the present invention, there is provided a music theme classification method, medium, and system that may determine such a similarity by calculating an inner product of a theme class vector and a music title class vector, and assign at least one theme having a maximum similarity value as a theme corresponding to a music title, and thereby automatically classify a theme of the music file by using the music title instead of requiring a manual classifying of the theme for the music file, one by one, by a system administrator as in the conventional techniques.

Still further, according to an embodiment of the present invention, feature candidates may be extracted from a music title stored in a music title database, for example, a feature candidate whose chi square statistics is greater than an average value of the chi square statistics of the feature candidates may be selected as a feature, and a theme class vector may be generated by assigning a feature value of the feature.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of classifying music, comprising:
    generating a theme vector corresponding to at least one music theme;
    generating a music title vector corresponding to a music title for the music;
    calculating, using at least one processing device, a similarity between the theme vector and the music title vector; and
    assigning a theme of the music title, to classify the music according to theme, based on the similarity.

2. The method of claim 1, wherein the generating of the theme vector comprises:
    extracting feature candidates from the music title;
    selecting a feature from the extracted feature candidates; and
    generating the theme vector by assigning a feature value of the selected feature.

3. The method of claim 2, wherein the extracting of the feature candidates from the music title comprises:
    analyzing a morpheme of the music title; and
    extracting a unigram and co-occurrence of the music title.

4. The method of claim 3, wherein the extracting of the unigram and co-occurrence comprises:
    extracting a content word and an end of a word from the music title; and
    classifying the respective content word and the end of the word via an ontology search.

5. The method of claim 3, wherein the extracting of the unigram and co-occurrence comprises:
    expressing the music title in a classification array of plural classes; and
    extracting two certain classes represented in the classification array as the feature candidates when the two certain classes are detected in the music title based on the classification array.

6. The method of claim 5, wherein the extracting of the two certain classes as the feature candidates comprises extracting co-occurrences $C_i*C_j$ as the feature candidates when classes $C_i$ and $C_j$ satisfy a following condition, $$c_i \subset m_k \text{ and } c_j \subset m_k \text{ and } |L(c_i)-L(c_j)| \leq \alpha,$$

wherein $m_k$ is the music title expressed in the classification array, and $L(x)$ identifies an index position x in the classification array, and $\alpha$ is a predetermined value.

7. The method of claim 2, wherein the selecting of the feature from the extracted feature candidates comprises selecting the feature from the extracted feature candidates based on predetermined chi square statistics.

8. The method of claim 7, wherein the selecting of the feature from the extracted feature candidates based on predetermined chi square statistics comprises:
    calculating chi square statistics as associated with each feature candidate;
    calculating an average of the calculated chi square statistics; and
    selecting a feature candidate associated with a chi square statistic greater than the average of the chi square statistics as the feature.

9. The method of claim 2, wherein the generating of the theme vector by assigning the feature value of the selected feature comprises assigning the feature value of the feature by using binary numbers.

10. The method of claim 9, wherein the assigning of the feature value of the feature by using binary numbers comprises:
  establishing a binary 1 as the feature value when the respective feature corresponds to a relevant theme;
  establishing a binary 0 as the feature value when the respective feature does not correspond to the relevant theme; and
  generating the theme vector based on the established feature value.

11. The method of claim 2, further comprising maintaining the music title in a music title database.

12. The method of claim 1, wherein the calculating of the similarity between the theme vector and the music title vector comprises:
  calculating an inner product of the theme vector and the music title vector; and
  determining the calculated inner product to be the similarity.

13. The method of claim 1, wherein the assigning of the theme of the music title based on the similarity comprises assigning the theme having a maximum similarity value as the theme of the music title.

14. At least one medium comprising computer readable code to implement a method of classifying music, the method comprising:
  generating a theme vector corresponding to at least one music theme;
  generating a music title vector corresponding to a music title for the music;
  calculating a similarity between the class vector and the music title vector; and
  assigning a theme of the music title, to classify the music according to theme, based on the similarity.

15. A system classifying music, comprising:
  a theme vector generation unit to generate a theme vector corresponding to at least one music theme;
  a music title vector generation unit to generate a music title vector corresponding to a music title for the music;
  a similarity calculation unit to calculate a similarity between the theme vector and the music title vector; and
  a music title theme assignment unit to assign a theme of the music title, to classify the music according to theme, based on the similarity.

16. The system of claim 15, further comprising:
  a feature candidate extraction unit to extract feature candidates from the music title; and
  a feature selection unit to select a feature from the extracted feature candidates,
  wherein the theme vector generation unit generates the theme vector by assigning a feature value of the selected feature.

17. The system of claim 16, wherein the feature candidate extraction unit analyzes a morpheme of the music title and extracts a unigram and co-occurrence of the music title.

18. The system of claim 17, wherein the feature candidate extraction unit extracts a content word and an end of a word from the music title and classifies the respective content word and the end of the word via an ontology search.

19. The system of claim 17, wherein the feature candidate extraction unit expresses the music title in a classification array of plural classes and extracts two certain classes represented in the classification array as the feature candidates when the two certain classes are detected in the music title based on the classification array.

20. The system of claim 16, wherein the feature selection unit selects the feature from the extracted feature candidates based on predetermined chi square statistics.

21. The system of claim 20, wherein the feature selection unit calculates chi square statistics as associated with each feature candidate, calculates an average of the calculated chi square statistics, and selects a feature candidate associated with a chi square statistic greater than the average of the chi square statistics as the feature.

22. The system of claim 16, wherein the theme vector generation unit establishes a binary 1 as the feature value when the respective feature corresponds to a relevant theme, establishes a binary 0 as the feature value when the respective feature does not correspond to the relevant theme, and generates the theme vector based on the established feature value.

23. The system of claim 16, further comprising a music title database for maintaining at least a plurality of music titles, including the music title.

24. The system of claim 15, wherein the music title vector generation unit extracts a feature by analyzing a morpheme of the music title, and by extracting a unigram and co-occurrence of the music title, and generates the music title vector by assigning a feature value to the extracted feature.

25. The system of claim 15, wherein the similarity calculation unit calculates an inner product of the theme vector and the music title vector and determines the calculated inner product to be the similarity.

26. The system of claim 15, wherein the music title theme assignment unit assigns the theme having a maximum similarity value as the theme of the music title.

27. A method of classifying music, comprising:
  generating a music title vector corresponding to a music title for music;
  calculating, using at least one processing device, a similarity between a theme vector and the music title vector, wherein the theme vector corresponds to at least one music theme; and
  assigning a theme of the music title, to classify the music according to theme, based on the similarity.

* * * * *

UNITED STATES PATENT AND TRADEMARK OFFICE
CERTIFICATE OF CORRECTION

| | |
|---|---|
| PATENT NO. | : 7,863,510 B2 |
| APPLICATION NO. | : 11/650446 |
| DATED | : January 4, 2011 |
| INVENTOR(S) | : Jung Eun Kim et al. |

It is certified that error appears in the above-identified patent and that said Letters Patent is hereby corrected as shown below:

Column 10, Line 47, In Claim 6, after "array," delete "and".

Column 11, Line 32, In Claim 14, delete "class" and insert --theme--, therefor.

Signed and Sealed this
Twenty-sixth Day of April, 2011

David J. Kappos
*Director of the United States Patent and Trademark Office*